Figure 1:
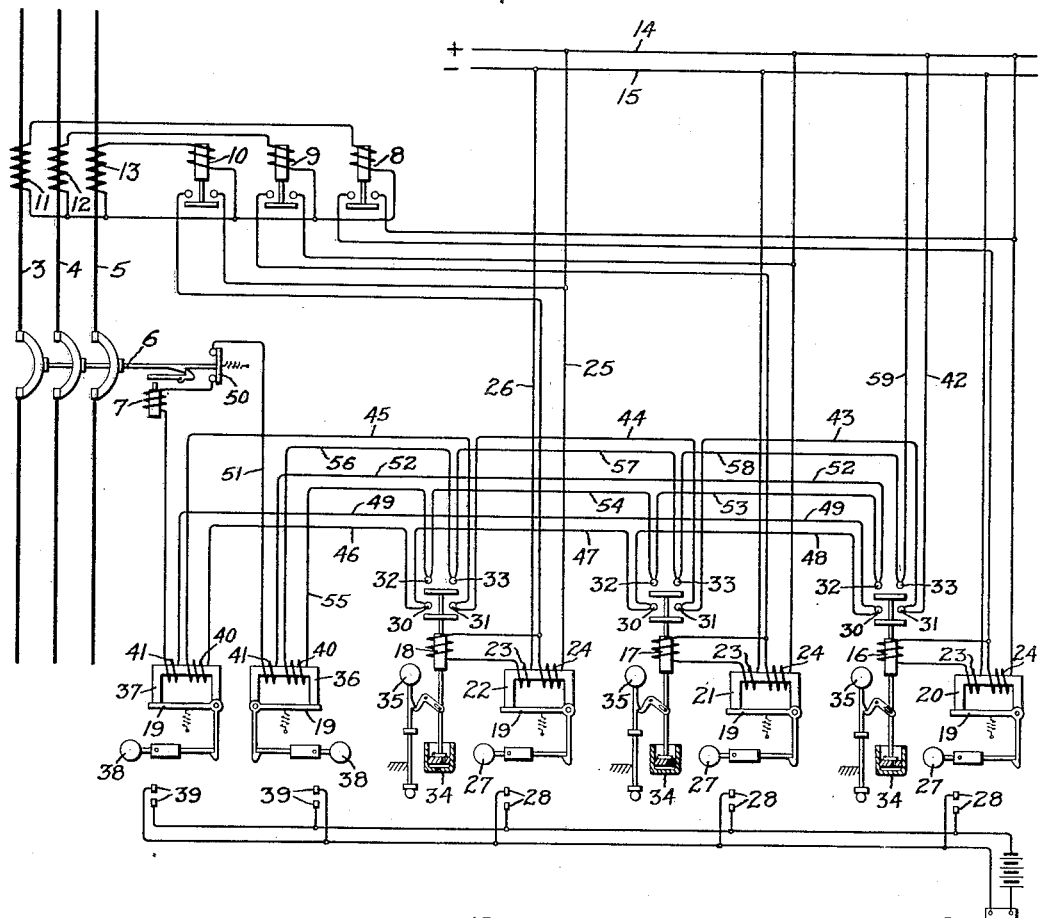

July 18, 1933. P. KANNENGIESSER 1,919,066
SUPERVISION OF PROTECTIVE APPARATUS FOR ELECTRIC SYSTEMS Filed Oct. 28, 1927

Inventor:
Paul Kannengiesser,
by *Alexander S. [illegible]*
His Attorney.

Patented July 18, 1933

1,919,066

UNITED STATES PATENT OFFICE

PAUL KANNENGIESSER, OF PANKOW-BERLIN, GERMANY, ASSIGNOR TO GENERAL ELECTRIC COMPANY, A CORPORATION OF NEW YORK

SUPERVISION OF PROTECTIVE APPARATUS FOR ELECTRIC SYSTEMS

Application filed October 28, 1927, Serial No. 229,510, and in Germany December 2, 1926.

My invention relates to improvements in the supervision of protective apparatus for electric systems and has for an object to provide an improved supervisory arrangement whereby irregularities or departures from the normal condition of the control circuits of the protective apparatus immediately become obvious to those responsible for its maintenance and operation.

The reliable operation of automatic protective devices of electric systems is among other things dependent on the regular or normal condition of the control circuits of the protective arrangements. Lack of voltage from the control source, breaking of conductors, earth connections, etc. are faults which occur unobserved by the attendants and which may seriously affect the correct operation of the protective arrangements.

For supervising the protective arrangements, glow lamps have been arranged in parallel with the contacts of the individual protective relays. These lamps through their illumination are to indicate that the control circuits are in normal condition. It has, however, been found that such a supervisory arrangement is not reliable, since a lamp on the occurrence of an earth connection may become lighted even though there is an interruption or failure of the control circuits. Another danger to correct operation of the protective apparatus is that the protective relays control the protective switches such as circuit breakers only through a single contact on one side of the switch actuating means, the other side of which is directly connected to the control source. With such arrangements, earth connections in the control circuits can effect operation of the switch independently of the protective relays.

It is of course desirable to know which of the protective relays has operated in case of a fault on the system to control the opening of the circuit breakers. In order to do this there have been associated with the individual protective relays, indicator relays connected in series in the control circuits of the protective relays. With such an arrangement the current for operating the indicator relay is not always the same. Thus if only one protective relay responds then the entire releasing current of the associated circuit breaker energizes the indicator relay. If, however, two or more protective relays operate simultaneously, then each of the associated indicator relays in consequence of their parallel connection with the control circuit will be energized only by a fraction of the releasing current corresponding to the number of the relays operating. Thus with the simultaneous response of a plurality of relays, it may happen that the currents apportioned to the respective indicator relays are too small to effect their operation.

In accordance with my invention, a constant supervision of the protective arrangements is assured by associating with the protective apparatus indicator devices whose control circuits are conducted over all relays and contacts of the protective arrangements concerned. Upon failure of the control circuit as by a broken conductor, earth connection, etc., the indicator devices respond so that a fault in the protective arrangement is immediately made known.

My invention will be better understood from the following description when considered in connection with the accompanying drawing and its scope will be pointed out in the appended claims.

Figure 2:
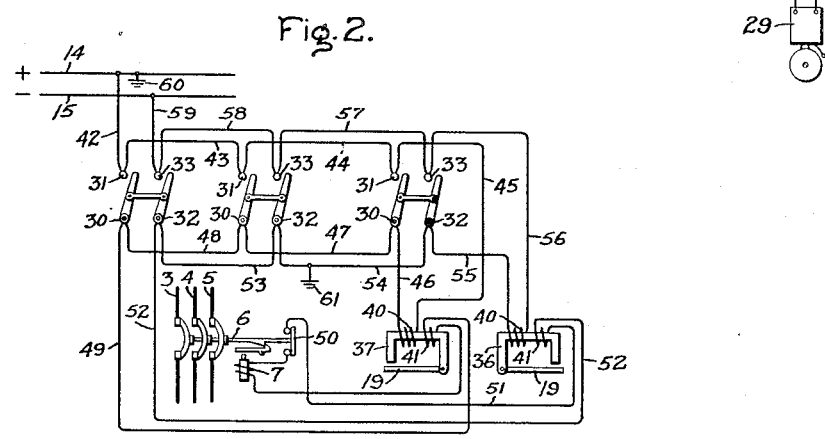

In the accompanying drawing, Fig. 1 illustrates diagrammatically a supervisory arrangement embodying my invention and Fig. 2 illustrates diagrammatically in condensed form, a portion of the embodiment of my invention shown in Fig. 1.

In the accompanying drawing an electric circuit shown as polyphase and as comprising conductors 3, 4, 5 is arranged to be controlled by suitable interrupting means such as a circuit breaker 6 of the latched closed type. This is provided with electromagnetic tripping means, illustrated as comprising a trip coil 7. For controlling the circuit breaker 6 in response to abnormal circuit conditions, there may be provided suitable protective relays such as over-current relays 8, 9, 10 connected to be energized from the circuit as through current transformers 11, 12, 13 respectively. While I have shown a particular circuit arrangement for over-current relays, it is to be understood that so far as my present invention is concerned any suitable arrangement of protective relays for any abnormal circuit conditions may be used. The protective relays 8, 9, 10 operate on the occurrence of abnormal circuit conditions to control the energization of the trip coil 7 through control circuits supplied from a suitable control source, indicated as busses 14, 15 in a manner hereinafter set forth.

In the illustrated embodiment of my invention there are associated with the protective relays 8, 9, 10 intermediate relays 16, 17, 18 respectively and indicator relays 20, 21, 22 respectively. The indicator relays 20, 21, 22 are for the purpose of indicating a failure in the circuits of the windings of the intermediate relays which are arranged to be controlled by the respective protective relays. For this purpose each of the indicator relays 20, 21, 22 may comprise a winding 23 connected in series with the winding of the associated intermediate relay and also in series relation with the contacts of the associated protective relay. Each of the indicator relays may further comprise a winding 24 which is connected in parallel with the contacts of the associated protective relay so that normally, that is with the protective relay contacts open, the winding 24 is in a closed control circuit as follows:—control bus 14, conductor 25, winding 24, winding of intermediate relay 18, winding 23, conductor 26 and bus 15. Under these conditions the current in this circuit is sufficient to hold the armature 19 of the indicator relay in the attracted position so as to maintain the disc 27 in the position shown but there is not sufficient current to effect the response of the intermediate relay.

With this arrangement, it is obvious that on a failure of the circuit of the indicator relay such as the breaking of a conductor, the indicator disc 27 will be released. A further indication may be obtained by having the disc arranged to control contacts 28 in the circuit of an audible signal such as a bell 29.

On the occurrence of an abnormal condition, such as a fault involving the circuit conductor 5, the over-current relay 10 will respond and in closing its contacts will short-circuit the winding 24 of the indicator relay 22. Under these conditions the winding 23 of the indicator relay 22 will be sufficiently energized to maintain the armature 19 in the attracted position. Likewise the winding of the intermediate relay 18 is sufficiently energized to cause it to respond and close its contacts 30, 31 and 32, 33. If desired the intermediate relays 16, 17, 18 may be provided with a time limit device 34 such as a dash-pot and also an indicator disc or drop 35. With this arrangement of the indicator relay windings 23, 24, the winding of the intermediate relay 18 and the contacts of the protective relays, it is obvious that the indicator relays release their respective discs only when a failure occurs in the energizing circuit of the associated intermediate relay.

Where, for example, in place of the three protective relays 8, 9, 10 together with their associated intermediate and auxiliary relays, only a single protective relay is required the simplest arrangement occurs when the intermediate relay is replaced by the circuit breaker trip coil. In general, however, a plurality of protective relays such as 8, 9, 10 may control through their associated intermediate relays 16, 17, 18 a single circuit breaker 6. Consequently, by arranging the contacts 30, 31 and 32, 33 in the trip coil control circuit on each side of the trip coil between the source and the trip coil, the normally closed control circuit is controlled at two points, one on each side of the trip coil. In the illustrated embodiment of my invention, the respective contacts 30, 31, and 32, 33 of the intermediate relays are so connected in parallel for controlling the trip coil circuit that the connecting conductors from the source 14, 15 are in loops to the contacts. Each contact 30, 31, 32, 33 therefore, has an incoming and outgoing line extending from one intermediate relay to another. The intermediate relays 16, 17, 18 moreover control the energization not only of the trip coil 7 but also of indicator relays 36, 37 for indicating a failure of the trip coil control circuit. The indicator relays 36, 37 have discs 38 which when released show the failure of the control circuit and may also control contacts 39 in the circuit of the bell 29. Each of the indicator relays 36, 37 has two windings 40, 41 arranged in series in the trip coil control circuit, those for relay 36 being on one side of the trip coil and those for relay 37 on the other side of the trip coil. The windings 40 of the relays 36, 37 are connected in parallel respectively with the contacts 32, 33 and 30, 31 of the intermediate relays 16, 17, 18.

Assuming now as shown in Fig. 2 that the circuit breaker 6 is closed and none of the intermediate relays have operated, then the windings of the indicator relays 36, 37 are included in a closed circuit comprising bus 14, conductors 42, 43, 44 and 45, winding 40 of the indicator relay 37, conductors 46, 47, 48 and 49, winding 41 of the indicator relay 37, trip coil 7, circuit breaker auxiliary switch 50, conductor 51, winding 41 of the indicator relay 36, conductors 52, 53, 54 and 55, winding 40 of the indicator relay 36, conductors 56, 57, 58 and 59, and bus 15. In this circuit the windings 40, 41 are so proportioned that sufficient current flows in the windings 40 to maintain the armatures 19 of the indicator relays 36, 37 in the latched or attracted position but not enough to trip the circuit breaker. When, however, the windings 40 are short circuited as a result of the operation of one or more of the intermediate relays 16, 17, 18, enough current flows in the trip coil control circuit not only to effect the openings of the circuit breaker but also to energize the windings 41 sufficiently to maintain the armatures 19 of the indicator relays 36, 37 in the attracted position. If, however, the closed circuit traced above should fail for any reason such as a broken conductor or connection, the indicator relays 36, 37 would become deenergized, thus releasing the discs 38 and also energizing the alarm 29.

If we assume as before that the intermediate relay 18 is energized as a result of a fault causing the operation of the protective relay 10, then by reason of the closing of the contacts 32, 33 the winding 40 of the indicator relay 36 is short-circuited and likewise the winding 40 of the indicator relay 37 by the contacts 30, 31. Enough current will now flow in the trip coil circuit not only to effect the opening of the circuit breaker 6 but also to energize the windings 41 of the indicator relays 36, 37 sufficiently to hold their armatures in the attracted position. The indicator relays 36, 37 are, therefore, prevented from giving any indication so long as the trip circuit is intact. Of course, if this trip circuit includes the circuit breaker auxiliary switch 50 as shown, these relays will indicate that the trip circuit is open when the circuit breaker 6 is open.

Inasmuch as one side of the control source 14, 15 is sometimes purposely grounded and as the control system is also subject to accidental grounds, it is possible for double grounds to occur such as shown by 60, 61 in Fig. 2. In this figure which represents only a portion of the apparatus shown in Fig. 1, the intermediate relays 16, 17, 18 are shown merely by their contacts 30, 31, 32, 33. It will now be obvious that with the control system subject to the double ground 60, 61, it is impossible for the trip coil 7 to open the circuit breaker 6 in case of a fault on the circuit 3, 4, 5 or otherwise since the trip coil is short-circuited by the double ground. In this case, however, an immediate indication of the failure of the control circuit is given by the indicator relay 37 both of whose windings 40, 41 are also short-circuited thus releasing the armature 19 and its controlled disc 38, shown only in part in Fig. 2. The short-circuit is as follows: bus 15, conductors 59, 58, 57 and 56, winding 40 of the indicator relay 36, conductors 55 and 54, grounds 61 and 60 and bus 14. The grounds may, of course, be so located that the windings 40, 41 of the indicator relay 36 are short-circuited while one of the windings of the indicator relay 37 may remain energized. It is, therefore, preferable to employ a plurality of indicator relays 36, 37 as shown in the drawing.

Although I have shown and described my invention in considerable detail, I do not wish to be limited to the exact arrangement shown, but seek to cover in the appended claims all those modifications that fall within the true spirit and scope of my invention.

What I claim as new and desire to secure by Letters Patent of the United States, is:

1. In combination, an electric circuit, a circuit breaker therefor, and means for controlling the opening of the circuit breaker on the occurrence of abnormal circuit conditions comprising a trip coil, a control circuit for said trip coil normally energized to an extent insufficient to cause the operation thereof, a source of current for energizing the control circuit, means for controlling the energization of said control circuit including a plurality of intermediate relays, a plurality of protective relays connected to be energized from said electric circuit and respectively associated with said intermediate relays, and means controlled by each protective relay for effecting the operation of its associated intermediate relay on the occurrence of abnormal circuit conditions causing the operation of the protective relay.

2. In combination, an electric circuit, a circuit breaker therefor, electromagnetic means for controlling the opening of the circuit breaker comprising a normally energized control circuit for the winding of said means, means for indicating a failure of the control circuit comprising an indicator relay having a winding in the control circuit, means for deenergizing the winding of the indicator relay on the occurrence of a fault on said electric circuit, and means for maintaining the indicator relay in a condition to prevent false indication of control circuit failure when the winding of the relay is deenergized while the control circuit is sound.

3. In combination, an electric circuit, a circuit breaker therefor, electromagnetic means for controlling the opening of the circuit breaker, a control circuit for the winding of said electromagnetic means normally energized to an extent insufficient to cause the operation thereof, means for indicating a failure of the control circuit including an indicator relay having a winding in series relation with the control circuit, means for short-circuiting said relay winding on the occurrence of a fault on said electric circuit whereby to increase the energization of the control circuit to an extent sufficient to operate said electromagnetic means and means connected to be energized from said control circuit for maintaining the relay in a condition to prevent false indication of control circuit failure when said winding is short-circuited while the control circuit is sound.

4. In combination, an electric circuit, a circuit breaker therefor, electromagnetic means for controlling the opening of the circuit breaker, a control circuit for said electromagnetic means normally energized to an extent insufficient to cause the operation thereof, means for indicating a failure of the control circuit including an indicator relay having a winding connected to be energized from the control circuit, means for decreasing the energization of the relay winding on the occurrence of a fault on said electric circuit and means for maintaining the relay in a condition to prevent false indication of control circuit failure when the energization of said winding is decreased while the control circuit is sound.

5. In combination, an electric circuit, a circuit breaker therefor, means for controlling the opening of the circuit breaker on the occurrence of abnormal circuit conditions including a trip coil, a control circuit for said trip coil normally energized to an extent insufficient to cause the operation thereof, a source of current for energizing the control circuit, means for controlling the extent of the energization of said control circuit including an intermediate relay and means for effecting the operation of the intermediate relay on the occurrence of abnormal circuit conditions including a protective relay connected to be energized from said electric circuit.

6. In combination, an electric circuit, a circuit breaker therefor, means for controlling the opening of the circuit breaker on the occurrence of abnormal circuit conditions including a trip coil, a control circuit therefor, a source of current for energizing the control circuit, means for controlling the energization of the control circuit including an intermediate relay, a circuit for said intermediate relay normally energized to an extent insufficient to cause the operation thereof, means for effecting the operation of the intermediate relay on the occurrence of abnormal circuit conditions including a protective relay connected to be energized from said electric circuit, means for indicating a failure of the circuit of said intermediate relay including an indicator relay having a winding connected to the source in parallel with the contacts of the protective relay and in series with the winding of the intermediate relay and means for maintaining the indicator relay in a condition to prevent false indication of control circuit failure when said protective relay operates while the circuit of the indicator relay is sound.

7. In combination, an electric circuit, a circuit breaker therefor, means for controlling the opening of the circuit breaker on the occurrence of abnormal circuit conditions including a trip coil, a control circuit for said trip coil normally energized to an extent insufficient to cause the operation thereof, a source of current for energizing the control circuit, an intermediate relay provided with contacts arranged in the control circuit on one side of the trip coil between the source and the trip coil, means for effecting the operation of the intermediate relay on the occurrence of abnormal circuit conditions including a protective relay connected to be energized from said electric circuit, means for indicating a failure of the control circuit comprising an indicator relay having a winding connected to the source in parallel with the contacts of the intermediate relay and in series with the trip coil and means for maintaining the indicator relay in a condition to prevent false indication of control circuit failure when said protective relay operates while the control circuit is sound.

8. In combination, an electric circuit, a circuit breaker therefor, means for controlling the opening of the circuit breaker on the occurrence of abnormal circuit conditions including a trip coil, a control circuit for said trip coil normally energized to an extent insufficient to cause the operation thereof, a source of current for energizing the control circuit, an intermediate relay provided with contacts arranged in the control circuit on one side of the trip coil between the source and the trip coil, means for effecting the operation of the intermediate relay on the occurrence of abnormal circuit conditions including a protective relay connected to be energized from said electric circuit, means for indicating a failure of the control circuit including an indicator relay having two energizing windings connected in series with each other and the trip coil, and means controlled by said intermediate relay and cooperating with said contacts for decreasing the energization of one of said windings when the intermediate relay operates.

9. In combination, an electric circuit, a circuit breaker therefor, means for controlling the opening of the circuit breaker on the occurrence of abnormal circuit conditions including a trip coil, a control circuit for said trip coil normally energized to an extent insufficient to cause the operation thereof, a source of current for energizing the control circuit, means for controlling the extent of the energization of said control circuit including an intermediate relay provided with contacts arranged in the control circuit on each side of the trip coil between the source and the trip coil, means for effecting the operation of the intermediate relay on the occurrence of abnormal circuit conditions including a protective relay connected to be energized from said electric circuit, means for indicating a failure of the control circuit including two indicator relays each having a winding, said windings being connected to the source in parallel respectively to the contacts of the intermediate relay and in series with the trip coil on opposite sides thereof between the trip coil and the intermediate relay contacts and means for maintaining said indicator relays in a condition to prevent false indication of control circuit failure when the intermediate relay operates while the control circuit is sound.

10. In combination, an electric circuit, a circuit breaker therefor, means for controlling the opening of the circuit breaker on the occurrence of abnormal circuit conditions including a trip coil, a control circuit for said trip coil normally energized to an extent insufficient to cause the operation thereof, a source of current for energizing the control circuit, means for controlling the extent of the energization of said control circuit including an intermediate relay, a circuit for said intermediate relay normally energized to an extent insufficient to cause the operation thereof, means for effecting the operation of the intermediate relay on the occurrence of abnormal circuit conditions including a protective relay connected to be energized from said electric circuit, means for indicating a failure in the circuit of said intermediate relay including an indicator relay having two energizing windings connected in series with each other and the winding of the intermediate relay, and means controlled by said protective relay for decreasing the energization of one of said windings when the protective relay operates.

PAUL KANNENGIESSER.